No. 881,062. PATENTED MAR. 3, 1908.
P. K. DOBYNS.
INSTRUMENT FOR INSERTING TAGS BENEATH THE SKIN OF ANIMALS.
APPLICATION FILED MAR. 9, 1907.
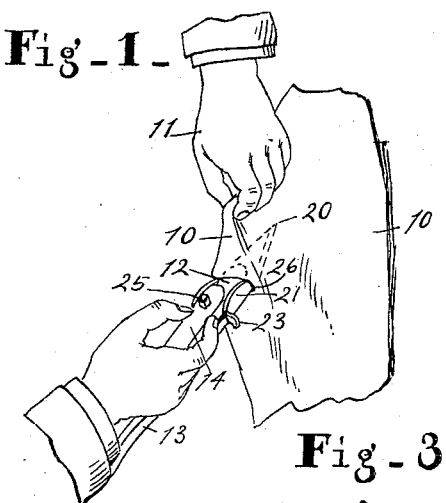
Fig-1-
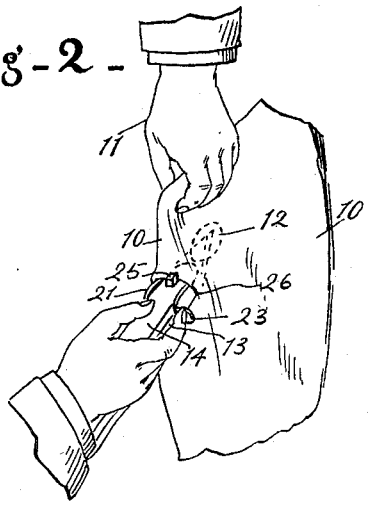
Fig-2-
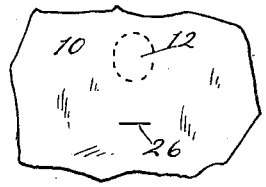
Fig-3-
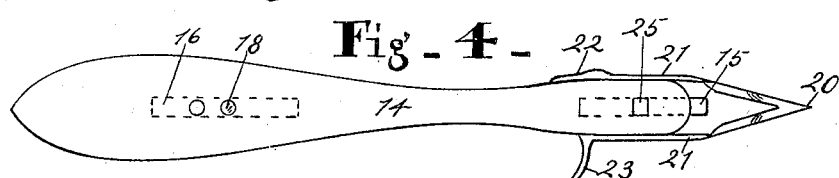
Fig-4-
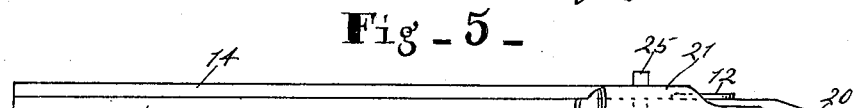
Fig-5-
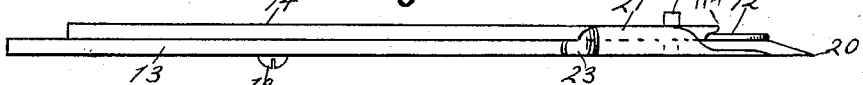
Fig-6-
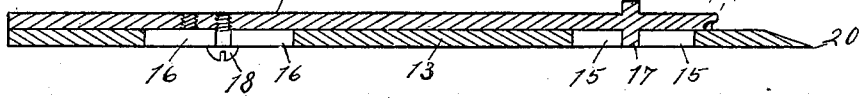
Fig-7-
WITNESSES:
W. M. Gentle
N. Allemong
INVENTOR.
Porter K. Dobyns.
BY
J. H. Lockwood
ATTORNEY.
THE NORRIS PETERS CO., WASHINGTON, D. C.

UNITED STATES PATENT OFFICE.

PORTER K. DOBYNS, OF FRANKLIN, INDIANA.

INSTRUMENT FOR INSERTING TAGS BENEATH THE SKIN OF ANIMALS.

No. 881,062.     Specification of Letters Patent.     Patented March 3, 1908.

Application filed March 9, 1907. Serial No. 361,625.

*To all whom it may concern:*

Be it known that I, PORTER K. DOBYNS, of Franklin, county of Johnson, and State of Indiana, have invented a certain new and useful Instrument for Inserting Tags Beneath the Skin of Animals; and I do hereby declare that the following is a full, clear, and exact description thereof, reference being had to the accompanying drawings, in which like letters refer to like parts.

The object of this invention is the provision of means for inserting tags or the like beneath the skin of animals for identifying them and as a substitute for branding. Branding injures the value of a horse and other animals and also is visible and can be altered.

This invention applies a subcutaneous tag to the animal that may be so located as to be difficult of discovery and therefore secret, and it does not injure the appearance and value of the animal.

The nature of the invention will be understood from the accompanying drawings and the following description and claims.

In the drawings Figure 1 is a perspective view of a portion of the animal's hide and the instrument applied thereto and partially introduced by a man's hands. Fig. 2 is a similar view showing the instrument fully introduced. Fig. 3 is a side elevation of the portion of the animal's hide after the tag is inserted, showing the tag by a dotted line. Fig. 4 is a plan view of the instrument in unoperated condition. Fig. 5 is a side elevation of the same. Fig. 6 is the same as Fig. 5 with the tag in place and the instrument operated. Fig. 7 is a central longitudinal section through Fig. 4.

In the drawings 10 represents a portion of the animal's hide where it is loose on the body. It is drawn by the hands 11 of the operator so the tag 12 may be inserted in the tissue between the skin and the muscle.

The instrument consists of two parts 13 and 14, the latter slidable on the former and with its forward end undercut to receive the tag under the overhanging extremity 114. To this end, part 13 has slots 15 and 16 into which the lug 17 and headed screw 18 extend respectively. The part 13 or base has a point 20 beveled and V-shaped and lateral flanges 21 near the point between which the part 14 lies. There are also finger pieces 22 and 23 on part 13 against which the fingers rest while the tool is being inserted. At the same time, the thumb of the operator bears upon the part 14 and against lug 25 and thereby pushes part 14 towards the point of part 13, and thereby the tag is pushed into place.

In operation the part 14 is drawn back to its limit on part 13 and the tag 12 laid upon part 13 and against and under the overhanging end 114 of part 14. The diameter of the tag is about the same as the wide portion of the point of part 13. When the point of the instrument is inserted in the skin, it carries with it the tag in beyond the skin, when part 14 is pushed forward. Then the instrument is withdrawn and the tag is held by the skin from following the instrument as the skin is stretched over the tag and the width of the slit 26 in the skin after relaxing, is less than the diameter of the tag. Hence the tag will not follow the instrument during withdrawal nor afterwards escape. When the slit 26 heals the location of the tag will be obscured and known only to the owner of the animal, for the tag is very thin.

What I claim as my invention and desire to secure by Letters Patent is:

1. An instrument for inserting tags beneath the skin of animals including one member with a flat V-shaped sharp point on the wide portion of which the tag may be placed, and another member mounted slidably thereon for pushing the tag off of said point after it has been inserted through the hide of the animal, the end of said slidable member being undercut to furnish a seat for the tag.

2. An instrument for inserting tags beneath the skin of animals including one member with a flat V shaped sharp point on the wide portion of which the tag may be placed, another member mounted slidably thereon for pushing the tag off said point after it has been inserted through the hide of the animal, finger pieces on the side of said first mentioned member, and a thumb piece on said slidable member, whereby they may be held and operated.

In witness whereof, I have hereunto affixed my signature in the presence of the witnesses herein named.

PORTER K. DOBYNS.

Witnesses:
    O. BREEDEN,
    N. ALLEMONG.